(12) United States Patent
McBain (10) Patent No.: US 10,443,413 B2
(45) Date of Patent: Oct. 15, 2019

(54) AXIAL MODULATING MECHANISM FOR ROTATING SHAFTS REALIZING CONTROLLABLE-PITCH-BLADE FANS

(71) Applicant: Jordan James McBain, Wayne, MI (US)

(72) Inventor: Jordan James McBain, Wayne, MI (US)

(73) Assignee: Dogged Mechatronics, Commerce Township, MI (US)

( * ) Notice: Subject to any disclaimer, the term of this patent is extended or adjusted under 35 U.S.C. 154(b) by 85 days.

(21) Appl. No.: 15/424,831

(22) Filed: Feb. 4, 2017

(65) Prior Publication Data

US 2018/0171973 A1 Jun. 21, 2018

Related U.S. Application Data

(60) Provisional application No. 62/437,644, filed on Dec. 21, 2016.

(51) Int. Cl.
*F01D 7/00* (2006.01)
*F03B 3/14* (2006.01)
*F03D 7/02* (2006.01)

(52) U.S. Cl.
CPC ............... *F01D 7/00* (2013.01); *F03B 3/145* (2013.01); *F03D 7/0224* (2013.01); *F05B 2260/74* (2013.01); *F05B 2260/76* (2013.01); *Y02E 10/723* (2013.01); *Y02E 10/725* (2013.01)

(58) Field of Classification Search
USPC ......................................................... 416/147
See application file for complete search history.

(56) References Cited

U.S. PATENT DOCUMENTS

| | | | | |
|---|---|---|---|---|
| 5,685,694 A | * | 11/1997 | Jones | F01D 7/02 416/147 |
| 6,065,933 A | * | 5/2000 | Secord | B63H 1/22 416/142 |
| 8,167,553 B2 | * | 5/2012 | Perkinson | B64C 11/36 416/1 |
| 8,870,539 B2 | * | 10/2014 | Hallstrom | F03D 7/0224 416/165 |
| 2008/0095627 A1 | * | 4/2008 | Castillo | F01P 7/06 416/147 |
| 2011/0293426 A1 | * | 12/2011 | Fucks | F01D 7/00 416/147 |

* cited by examiner

*Primary Examiner* — Daniel J Colilla (57) ABSTRACT

The invention describes a mechanism to cause an actuator born on a rotating shaft to modulate backwards and forwards independently of the motion of the rotating shaft. This mechanism is then used to realize a controllable-pitch blade fan. The axial modulating mechanism is achieved by mounting a thread on the rotating shaft onto which an axial modulator, with a cylindrical cavity having a mating thread, is mounted; magnets induce the axial modulator to rotate independently of the shaft's rotation in turn causing the axial modulator to move linearly along the shaft. This mechanism's linear motion is then used to force blades rotatably mounted on the shaft to rotate and consequently vary their pitch.

21 Claims, 6 Drawing Sheets

AXIAL MODULATING MECHANISM FOR ROTATING SHAFTS REALIZING CONTROLLABLE-PITCH-BLADE FANS

BACKGROUND OF THE INVENTION

1. Field of the Invention

An apparatus to cause axial modulation of an actuator on a rotating shaft used to realize a controllable-pitch-blade fan.

2. Description of the Prior Art

The proposed axial modulating mechanism for rotating shafts employs elements of the prior art. A rotor system is rotatably mounted in a stator system; the rotor system has a rotor thread consisting of a helical groove being affixed on a surface of the rotor system. Also an axial modulator having a helical groove capable of mating threadedly to the rotor thread is employed.

A blade hub is affixed to the rotor system which has a plurality of blades; the totality of which is formed to cause the blades to transfer mechanical energy between the rotor system and a fluid in which one or more of the blades may be immersed. One or more of the fan blades can be controllable-pitch blade(s) that are rotatably mounted within the blade hub.

German patent DE202009008726 bears the closest resemblance to the invention described in this application; it proposes pitch manipulation via a spindle system that is affixed rigidly to the stator system. This design incurs undue coupling between the rotor and stator system and as result is viewed as suboptimal in terms of energy efficiency.

The invention proposed herein relies in part on magnetic forces imparted from the stator system onto the rotor system in order to vary the fan blade's pitch while the fan is rotating without introducing additional mechanical coupling between the stator and rotor system. The most relevant prior art employing a similar approach can be found in U.S. Pat. No. 5,967,749 A. The approach contained therein manipulates the pitch of blades of an axial fan via magnets disposed in the stator system positioned at the tips of the blades.

SUMMARY OF THE INVENTION

The axial modulator is threadedly mated to the rotor thread and is acted on by an axial modulating mechanism, which is affixed to the stator system and is constituted in order to communicate a torque to the axial modulator, even in the presence of rotation in the rotor system, in order to cause the axial modulator to rotate relative to the rotor system, ultimately, to cause the axial modulator to undergo linear motion along the rotor system.

The blade hub is constituted to allow the axial modulator to move backwards and forwards within it. While the controllable-pitch blades are configured to interact with the axial modulator such that the axial modulator's motion through the blade hub causes the controllable-pitch blades to rotate within the blade hub.

ADVANTAGES OF THE INVENTION

The invention in its broadest aspect provides for an axial modulating mechanism for rotating shafts realizing a controllable-pitch-blade fan.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, an apparatus for an axial modulating mechanism for rotating shafts is described.

The apparatus for controllable-pitch blades (28) includes a stator system (20) into which a rotating shaft (22) is rotatably mounted. A rotor thread (24) consisting of a helical groove is affixed on the exterior surface of the rotating shaft (22). The rotating shaft (22) also has a blade hub (26) affixed to it in which a plurality of blades (30) are affixed. The fan blade hub (26) supporting the plurality of blades (30) is formed to cause the blades (28, 30) to transfer mechanical energy between the rotating shaft (22) and a fluid in which one or more of the blades (28, 30) are immersed. One or more of the plurality of blades (30) are configured to be controllable-pitch blade(s) (28) each of which has a rotatable base at its extent which are rotatably mounted within the blade hub (26). A plurality of blade locks (48) is configured and disposed to rotatably constrain the controllable-pitch blade(s) (28) within the blade hub (26).

Figure 1:
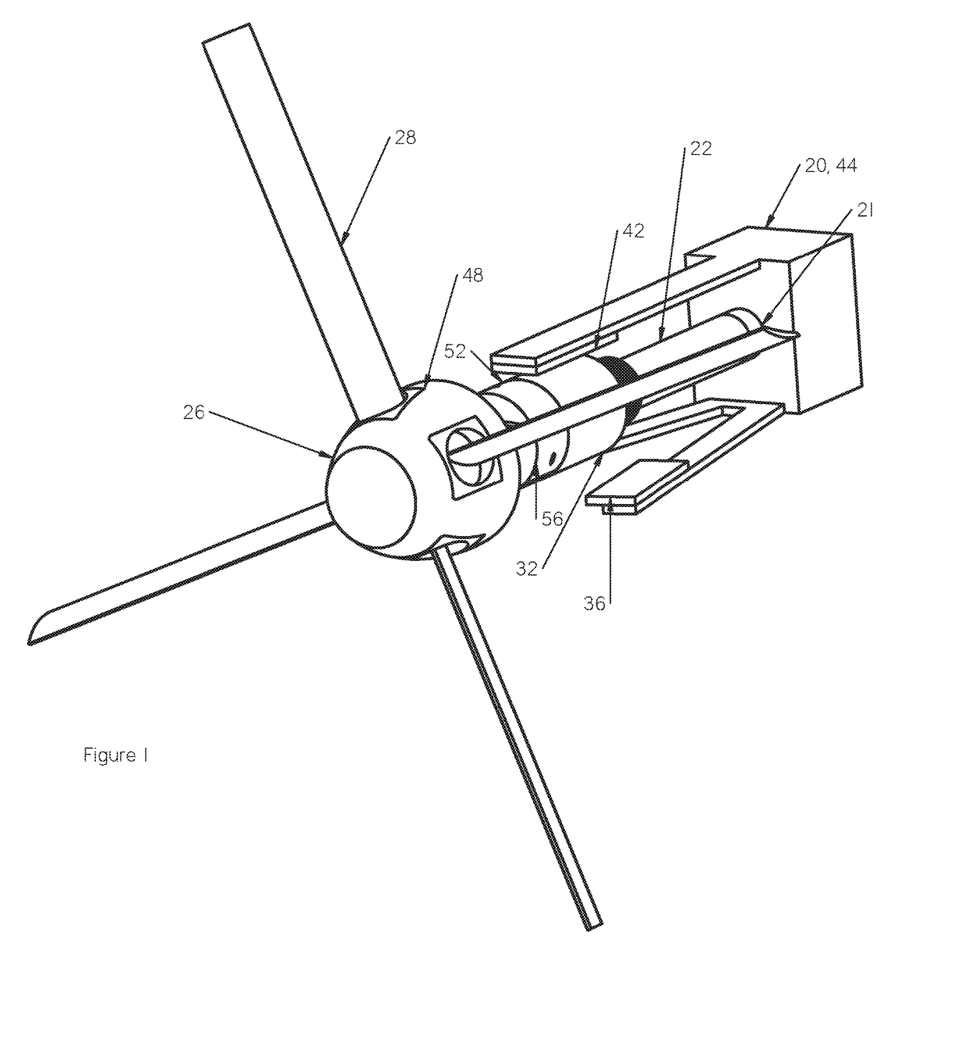
FIG. 1 is a perspective view of a controllable-pitch blade fan utilizing the mechanism proposed herein.
Figure 2:
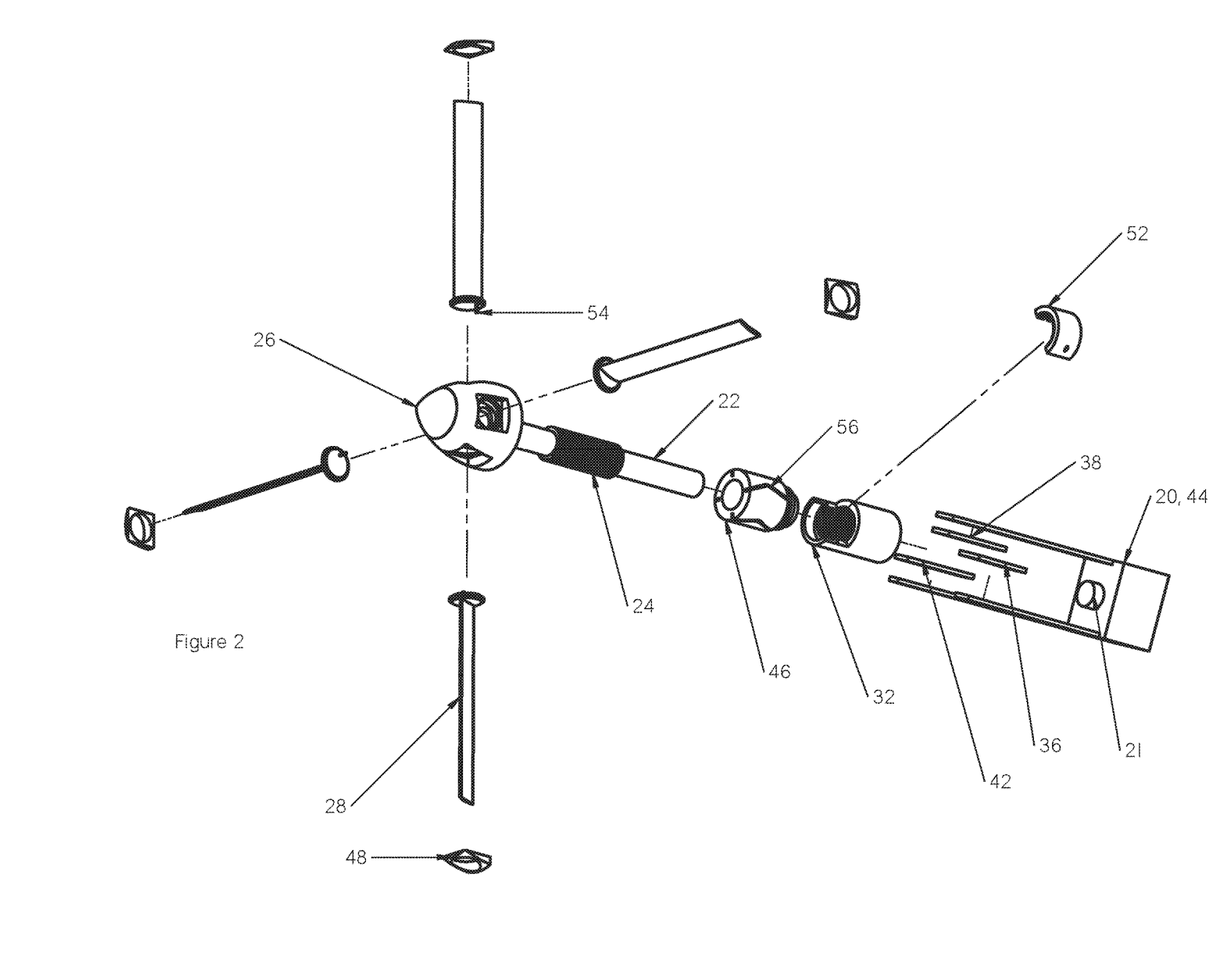
FIG. 2 is an exploded view of a controllable-pitch blade fan utilizing the mechanism proposed herein.

A prime mover (21) is affixed in the stator system (20); the prime mover (21) is configured to impart a rotational force to the rotating shaft (22) to which it is connected.

Figure 3:
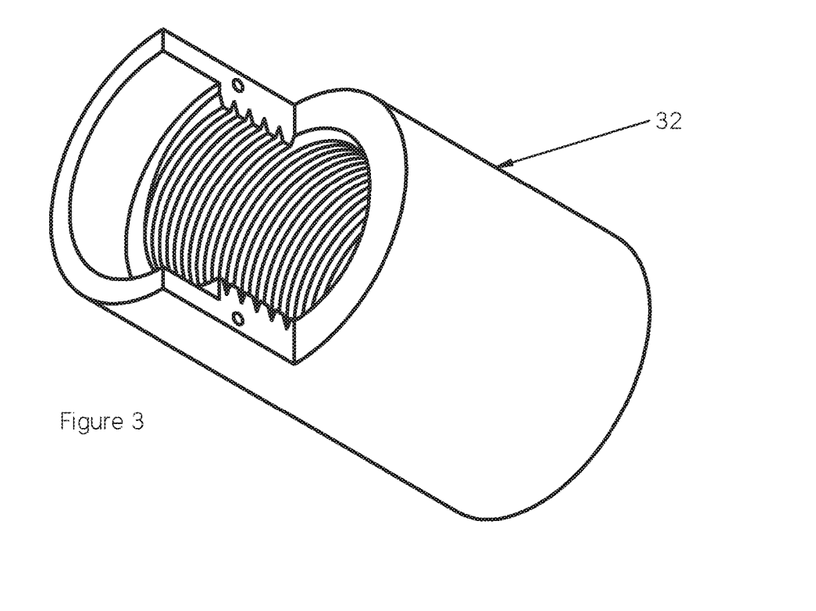
FIG. 3 is a perspective view of the axial modulating mechanism.

An axial modulator (32) having a cylindrical cavity with a helical groove being capable of mating threadedly to said rotor thread (24) is threadedly mated to the rotor thread (24). The blade hub (26) is constituted to allow the axial modulator (32) to move backwards and forwards within it while the rotor thread (24) is disposed on the rotating shaft (22) to allow the axial modulator (32) to pass within the blade hub (26).

The controllable-pitch blades (28) are configured to interact with the axial modulator (32) such that the axial modulator's (32) motion through the blade hub (26) causes the controllable-pitch blades (28) to rotate within the hub. Similarly, the blade hub (26) is configured to allow the axial modulator (32) to interface with the controllable-pitch blades (28) such that said axial modulator's (32) motion through the blade hub (26) causes the controllable-pitch blades (28) to rotate within it.

The axial modulator (32) is comprised of magnetic components that, when subjected to an imbalanced magnetic force, would tend to cause the axial modulator (32) to accelerate, and are disposed so as to cause the axial modulator (32) to rotate when it is threadedly constrained by the rotor thread (24) and when the axial modulator (32) is subjected to a magnetic force. The magnetic components of the axial modulator may be comprised of a ferromagnetic material or a magnetically polarized material.

An axial modulating mechanism (36, 38) is affixed to the stator system (20) and constituted in order to communicate a torque to the axial modulator (32), even in the presence of rotation in the rotating shaft (22), in order to cause the axial modulator (32) to rotate relative to the rotating shaft (22) ultimately to cause the axial modulator (32) to undergo linear motion along the rotating shaft (22). This is achieved by the axial modulating mechanism (36, 38) consisting of one or more electromagnet(s) (36, 38) capable of generating an electromagnetic force capable of imparting a torque on the magnetic components of the axial modulator (32). The axial modulating mechanism (36, 38) is disposed within the stator system (20) to enable the axial modulating mechanism (36, 38) to impart an electromagnetic force onto the axial modulator (32) when current is applied to the axial modulating mechanism (36, 38).

The magnetic components of the axial modulator (32) are then defined to consist of ferromagnetic material and correspondingly, the axial modulating mechanism (36, 38) is comprised of a set of one or more advancing electromagnets (36) and a set of one or more retarding electromagnets (38). The advancing electromagnets (36) are disposed and configured to generate an electromagnetic force to cause rotation in the axial modulator (32) which tends to cause the axial modulator (32) to move linearly in one axial direction relative to the rotor system when the rotating shaft (22) rotates in the clockwise direction. The retarding electromagnets (38) are disposed and configured to generate an electromagnetic force to cause rotation in the axial modulator (32) which tends to cause the axial modulator (32) to move linearly in the direction opposite from that achieved by the advancing electromagnet (36) when the rotating shaft (22) rotates in the clockwise direction.

The advancing and retarding electromagnets (36, 38) are configured to cause rotation in the opposite direction when the rotating shaft (22) rotates in the counterclockwise direction.

The axial modulator's (32) linear motion is coupled to a pitch manipulator (46) having a cylindrical shape via an axial-modulator lock (52). The pitch manipulator (46) is configured to mount rotatably within the axial modulator (32). A cylindrical cavity is deployed within the pitch manipulator (46), being coaxial with the pitch manipulator's (46) cylindrical exterior, with a diameter large enough for the pitch manipulator (46) to pass by the rotor thread (24) when the pitch manipulator's (46) cylindrical cavity is inserted into the rotating shaft (22).

Figure 4A:
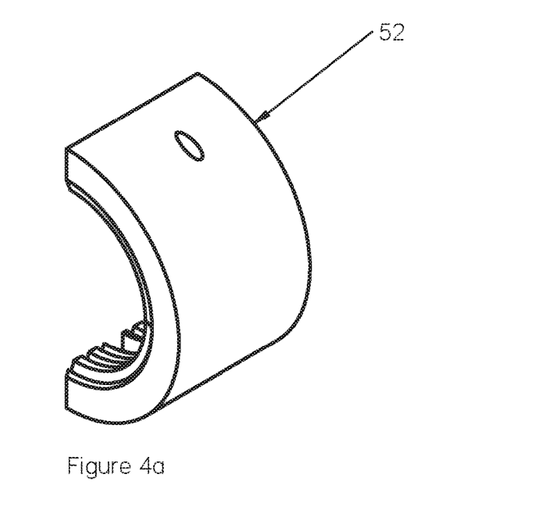
FIGS. 4a and 4b are different perspective views of the axial-modulator lock.
Figure 4B:
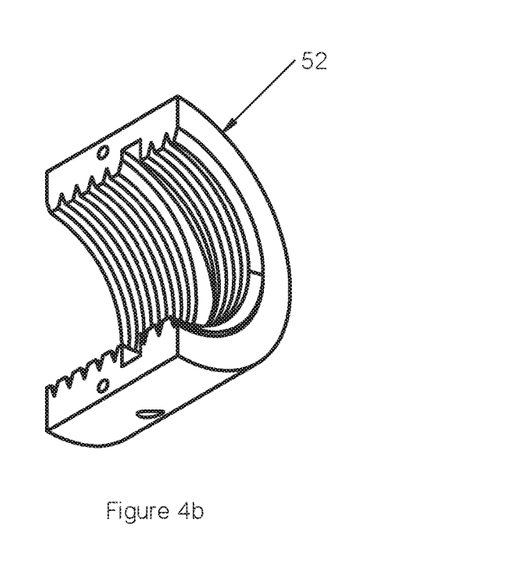

The axial-modulator lock (52) is configured and disposed to constrain the pitch manipulator (46) to have linear motion tied with the linear motion of the axial modulator (32) while permitting the pitch manipulator (46) to rotate independently of the axial modulator (32).

Figures 5A, 5B:
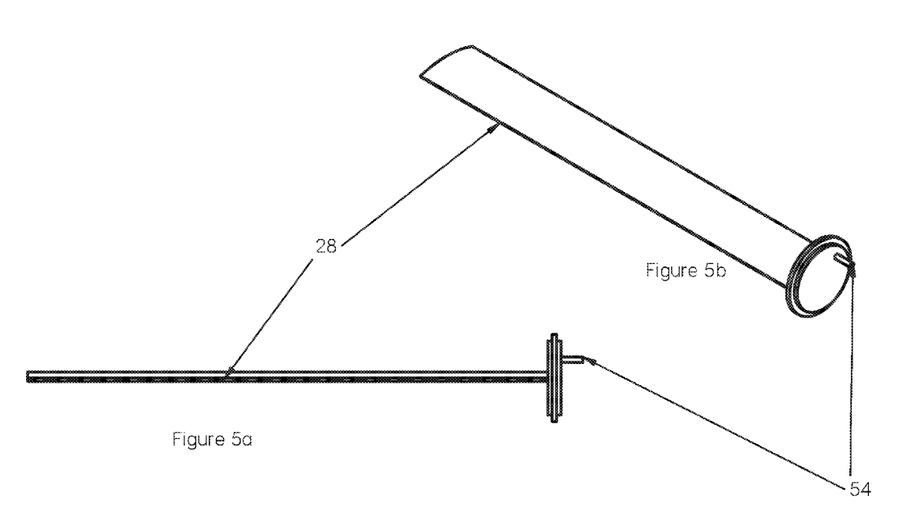
FIG. 5a is an orthogonal view of a controllable-pitch blade.
FIG. 5b is a perspective view of a controllable-pitch blade.
Figure 6:
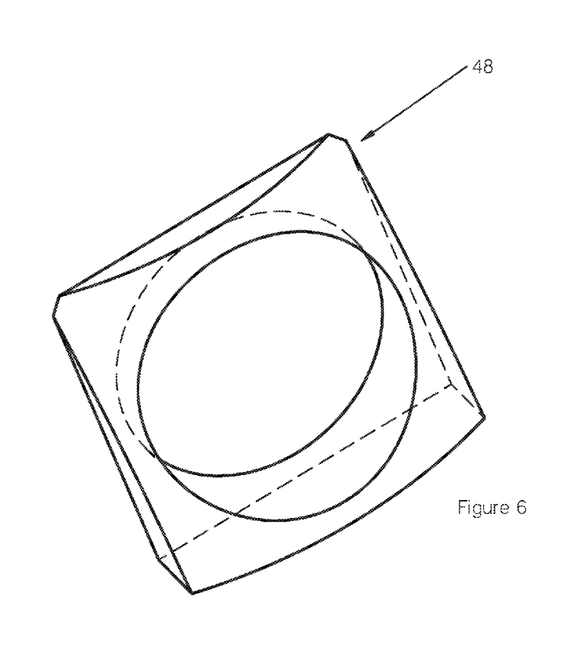
FIG. 6 is a perspective view of a blade lock.

The rotatable base of each controllable-pitch blade (28) has a blade pitch manipulator (54), having cylindrical form, protruding towards the interior of the blade hub (26) when the controllable-pitch blades (28) are rotatably mounted within the blade hub (26). Each blade pitch manipulator (54) is disposed radially away from the controllable-pitch blades' (28) center of rotation.

Figure 7A:
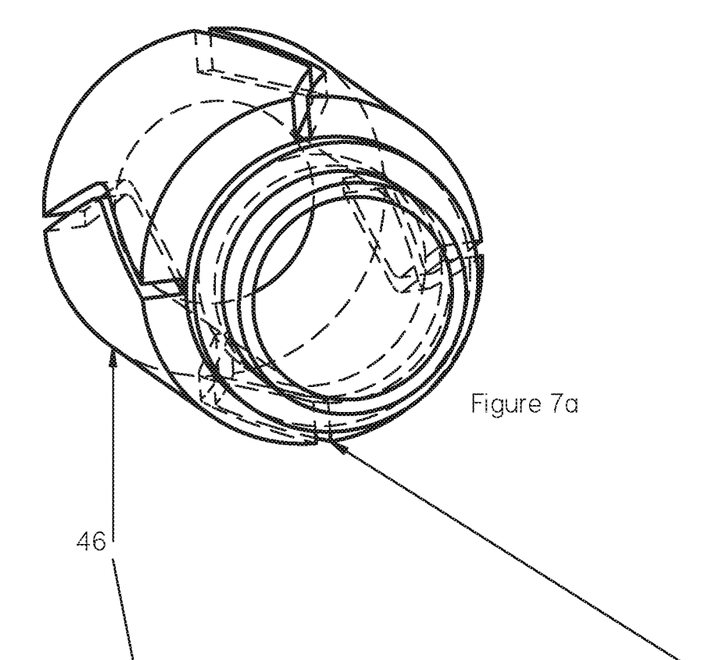
FIG. 7a is a perspective view of the pitch manipulating mechanism.
Figure 7B:
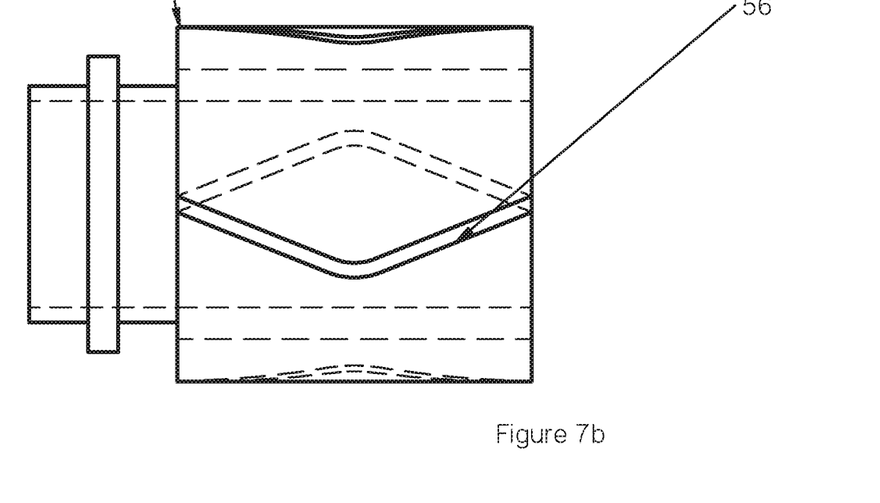
FIG. 7b is an orthogonal view of the same.
Figures 8A, 8B:
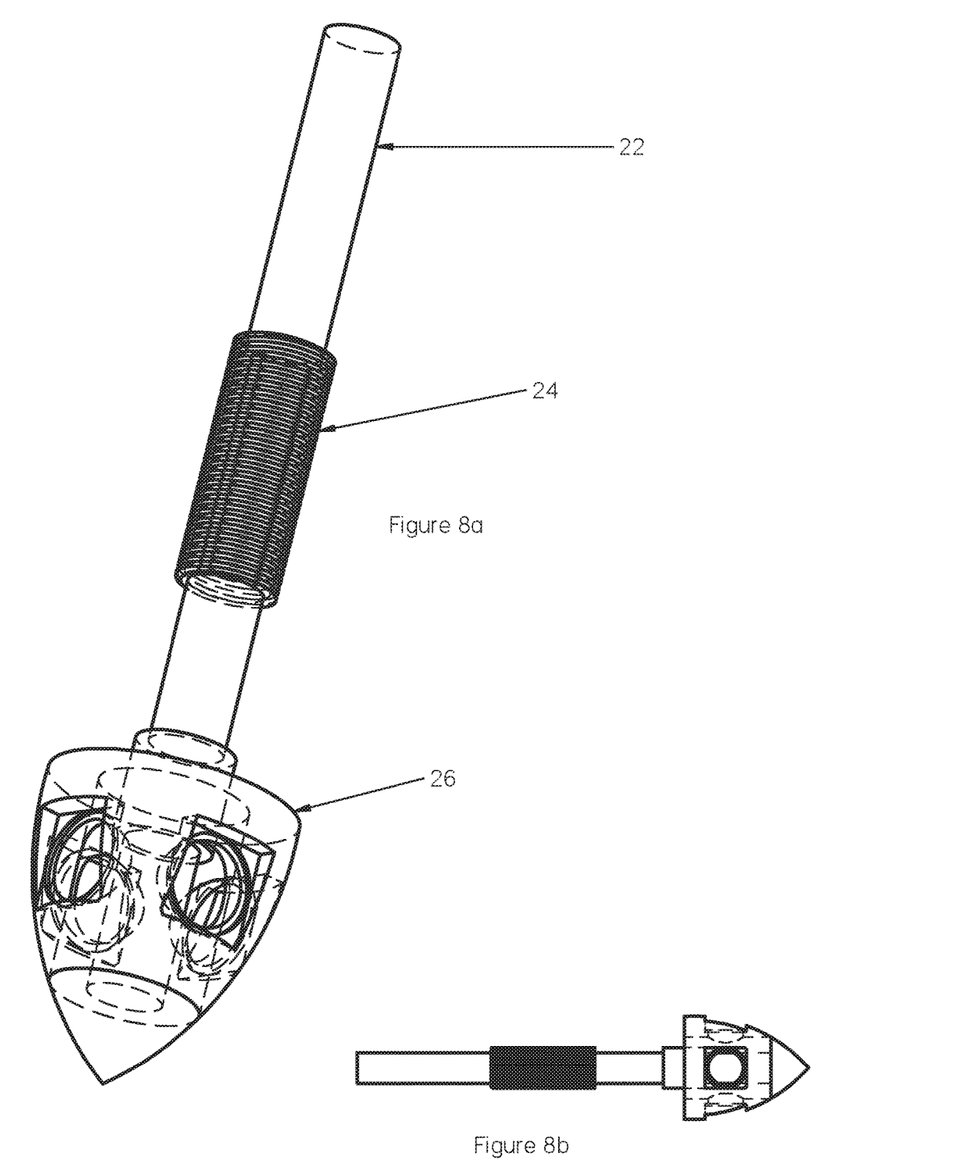
FIGS. 8a and 8b, respectively, are perspective and orthogonal views of the rotating shaft with blade hub and rotor thread.

A plurality of pitch-manipulating paths (56) are carved into the pitch manipulator's (46) exterior cylindrical surface through which the blade pitch manipulator (54) may pass when the blade pitch manipulators (54) are inserted into the pitch-manipulating paths (56) when the controllable-pitch blades (28) are rotatably mounted within the blade hub (26) and the pitch manipulator (46) is inserted into the blade hub (26).

The pitch-manipulating paths' (56) distribution about the pitch manipulator's (46) exterior cylindrical circumference, depth, width and profile along the length of the pitch manipulator's (46) cylindrical exterior are designed to force the controllable-pitch blades (28) to rotate when the controllable-pitch blades (28) are rotatably mounted within the blade hub (26), when each controllable-pitch blades' (28) blade pitch manipulator (54) is inserted into its respective pitch-manipulating path (56), when the pitch manipulator (46) is forced in and out of the blade hub (26) by the axial modulator (32).

The cylindrical cavity of the pitch manipulator (46) is inserted into the rotating shaft (22) with the pitch manipulator (46) being inserted into the blade hub (26) such that the blade pitch manipulators (54) of each controllable-pitch blade (28) are inserted into the controllable pitch blade's (28) respective pitch-manipulating path (56). The pitch manipulator (46) is rotatably mounted into the axial modulator (32) and secured to the axial modulator (32) with the axial-modulator lock (52) in order to tie the linear motion of the axial modulator (32) with the pitch manipulator (46).

A displacement sensor (42) capable of measuring the linear displacement of the axial modulator (32) is affixed to the stator system (20). The displacement sensor (42) is further connected to an electronics control unit (44) (ECU) having electronic circuits capable of measuring the displacement sensor's (42) measurements and capable of controlling the axial modulating mechanism (36, 38) as the advancing electromagnets (36) and retarding electromagnets (38) are electrically connected to the electronics control unit (44) in order for the ECU to control current applied thereto.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:
1. An apparatus for an axial modulating mechanism (36, 38) for rotating shafts (22) including;
   a stator system (20),
   a rotor system being rotatably mounted in said stator system (20), a rotor thread (24) consisting of a helical groove being affixed on a surface of said rotor system, an axial modulator (32) having a helical groove being capable of mating threadedly to said rotor thread (24), and characterized by, said axial modulator (32) being threadedly mated to said rotor thread (24), an axial modulating mechanism (36, 38) being affixed to said stator system (20) and being constituted in order to communicate a torque to said axial modulator (32), even in the presence of rotation in said rotor system, in order to cause said axial modulator (32) to rotate relative to said rotor system to cause said axial modulator (32) to undergo linear motion along said rotor system.

2. An apparatus as set forth in claim 1 further including said rotor system having a cylindrical cavity wherein said rotor thread (24) is affixed, said axial modulator (32) having an external cylindrical surface whereupon said helical groove of said axial modulator is affixed making said axial modulator capable of mating threadedly to said rotor thread (24) within said rotor system's cylindrical cavity, said axial modulator (32) being threadedly mated to said rotor system's rotor thread (24), and characterized by, said axial modulating mechanism (36, 38) being configured to impart torque to said axial modulator (32), while said axial modulator (32) is threadedly affixed within said cylindrical cavity of said axial modulator (32), to cause linear and rotational motion of said axial modulator (32) with respect to said rotor system.

3. An apparatus as set forth in claim 2 further including said axial modulator (32) being comprised of magnetic components that, when subjected to an imbalanced magnetic force, would tend to cause said axial modulator (32) to accelerate, said magnetic components within said axial modulator (32) being disposed so as to cause said axial modulator (32) to rotate when said axial modulator (32) is threadedly constrained within said rotor system's cavity and when said axial modulator (32) is subjected to a magnetic force, and characterized by, said axial modulating mechanism (36, 38) consisting of one or more electromagnet(s) (36, 38) capable of generating an electromagnetic force capable of imparting a torque on said magnetic components of said axial modulator (32), said axial modulating mechanism (36, 38) being disposed within said stator system (20) to enable it to impart an electromagnetic force onto said axial modulator (32) when current is applied to said axial modulating mechanism (36, 38).

4. An apparatus as set forth in claim 3 further including said magnetic components of said axial modulator (32) having a magnetic polarization.

5. An apparatus as set forth in claim 3 further including said magnetic components of said axial modulator (32) consisting of ferromagnetic material, and characterized by, said axial modulating mechanism's (36, 38) electromagnets being constituted in party by a set of one or more advancing electromagnets (36) being disposed and configured to generate an electromagnetic force to cause rotation in said axial modulator (32) which tends to cause said axial modulator (32) to move linearly in one axial direction relative to said rotor system, said axial modulating mechanism's (36, 38) electromagnets being constituted in part by a set of one or more retarding electromagnets (38) being disposed and configured to generate an electromagnetic force to cause rotation in said axial modulator (32) which tends to cause said axial modulator (32) to move linearly in the direction opposite from that achieved by said set of advancing electromagnets (36).

6. An apparatus as set forth in claim 5 further including a displacement sensor (42) capable of measuring the linear displacement of said axial modulator (32), an electronics control unit (ECU) (44) having circuits capable of receiving measurements from said displacement sensor (42) and capable of controlling said axial modulating mechanism (36, 38), said displacement sensor (42) being electrically connected to said electronics control unit (44), and characterized by, said set of advancing electromagnets (36) and said set of retarding electromagnets (38) being electrically connected to said ECU.

7. An apparatus as set forth in claim 1 further including a displacement sensor (42) capable of measuring the linear displacement of said axial modulator (32), and characterized by, an electronics control unit (44) having circuits capable of receiving measurements from said displacement sensor (42) and capable of controlling said axial modulating mechanism (36, 38), said displacement sensor (42) being electrically connected to said electronics control unit (44).

8. An apparatus for controllable-pitch blades (28) including a stator system (20), a rotor system being rotatably mounted in said stator system (20), a rotor thread (24) consisting of a helical groove being affixed on a surface of said rotor system, an axial modulator (32) having a helical groove being capable of mating threadedly to said rotor thread (24), said axial modulator (32) being threadedly mated to said rotor thread (24), a blade hub (26) being affixed to said rotor system, a plurality of blades (30) being affixed to said blade hub (26) and being formed to cause said blades (28, 30) to transfer mechanical energy between said rotor system and a fluid in which one or more of said blades (28, 30) may be immersed, wherein one or more of the plurality of blades (3) is a controllable-pitch blade (28), said controllable-pitch blade(s) (28) being rotatably mounted within said blade hub (26), and characterized by, said blade hub (26) being constituted to allow said axial modulator (32) to move backwards and forwards within said hub, said controllable-pitch blades (28) being configured to interact with said axial modulator (32) such that said axial modulator's (32) motion through said blade hub (26) causes said controllable-pitch blades (28) to rotate within said hub, an axial modulating mechanism (36, 38) being affixed to said stator system (20) and being constituted in order to communicate a torque to said axial modulator (32), even in the presence of rotation in said rotor system, in order to cause said axial modulator (32) to rotate relative to said rotor system to cause said axial modulator (32) to undergo linear motion along said rotor system.

9. An apparatus as set forth in claim 8 further characterized by said plurality of blades (30) imparting a torque on said rotating shaft (22) as the fluid, in which said plurality of blades (30) is immersed, pushes said blades (28, 30); this configuration realizing a controllable pitch turbine.

10. An apparatus as set forth in claim 8 further including a prime mover (21) being affixed in said stator system (20), being rotatably connected to said rotor system and being configured to impart an imbalanced torque on said rotor system causing said rotor system to rotate with respect to said stator system (20).

11. An apparatus as set forth in claim 8 further including
said axial modulator (32) being comprised of magnetic components that, when subjected to an imbalanced magnetic force, would tend to cause said axial modulator (32) to accelerate,
said magnetic components within said axial modulator (32) being disposed so as to cause said axial modulator (32) to rotate when said axial modulator (32) is threadedly constrained by said rotor thread (24) and when said axial modulator (32) is subjected to a magnetic force,
and characterized by,
said axial modulating mechanism (36, 38) consisting of one or more electromagnet(s) (36, 38) capable of generating an electromagnetic force capable of imparting a torque on said magnetic components of said axial modulator (32),
said axial modulating mechanism (36, 38) being disposed within said stator system (20) to enable it to impart an electromagnetic force onto said axial modulator (32) when current is applied to said axial modulating mechanism (36, 38).

12. An apparatus as set forth in claim 11 further including said magnetic components of said axial modulator (32) having a magnetic polarization.

13. An apparatus as set forth in claim 12 further including said magnetic components of said axial modulator (32) being constituted in part by electromagnets (36, 38).

14. An apparatus as set forth in claim 11 further including
said magnetic components of said axial modulator (32) consisting of ferromagnetic material,
and characterized by,
said axial modulating mechanism's (36, 38) electromagnets being constituted in part by a set of one or more advancing electromagnets (36) being disposed and configured to generate an electromagnetic force to cause rotation in said axial modulator (32) which tends to cause said axial modulator (32) to move linearly in one axial direction relative to said rotor system,
said axial modulating mechanism's (36, 38) electromagnets being constituted in part by a set of one or more retarding electromagnets (38) being disposed and configured to generate an electromagnetic force to cause rotation in said axial modulator (32) which tends to cause said axial modulator (32) to move linearly in the direction opposite from that achieved by said advancing electromagnets (36).

15. An apparatus as set forth in claim 8 further including
a displacement sensor (42) capable of measuring the linear displacement of said axial modulator (32),
an electronics control unit (44) (ECU) having circuits capable of receiving measurements from said displacement sensor (42) and capable of controlling said axial modulating mechanism (36, 38),
said displacement sensor (42) being electrically connected to said electronics control unit (44),
and characterized by,
said set of advancing electromagnets (36) and said set of retarding electromagnets (38) being electrically connected to said electronics control unit (44) in order for said ECU to control current applied thereto.

16. An apparatus as set forth in claim 8 further characterized by
a pitch manipulator (46) having a cylindrical shape and being configured to mount rotatably within said axial modulator (32),
said pitch manipulator (46) having a cylindrical cavity, being coaxial with said pitch manipulator's (46) cylindrical exterior, with a diameter large enough for said pitch manipulator (46) to pass by said rotor thread (24) when said cylindrical cavity of said pitch manipulator (46) is inserted into said rotating shaft (22),
an axial-modulator lock (52) being configured and disposed to constrain said pitch manipulator (46) to have linear motion tied with the linear motion of said axial modulator (32) while permitting said pitch manipulator (46) to rotate independently of said axial modulator (32),
a blade pitch manipulator (54) having cylindrical form protruding from the rotatable base of each of said controllable-pitch blades (28) towards the interior of said blade hub (26) when said controllable-pitch blades (28) are rotatably mounted within said blade hub (26),
each of said blade pitch manipulator(s) (54) being disposed radially away from the center of rotation of said blade pitch manipulators' (54) controllable-pitch blades (28),
a plurality of pitch-manipulating paths (56) carved into said pitch manipulator's (46) exterior cylindrical surface through which a respective blade pitch manipulator (54) may pass when the respective blade pitch manipulator (54) is inserted into one of said pitch-manipulating paths (56) when said controllable-pitch blades (28) are rotatably mounted within said blade hub (26) and said pitch manipulator (46) is inserted into said blade hub (26),
said pitch-manipulating paths (56) having distribution about said pitch manipulator's (46) exterior cylindrical circumference, depth, width and a profile along the length of said pitch manipulator's (46) cylindrical exterior to force said controllable-pitch blades (28) to rotate when said controllable-pitch blades (28) are rotatably mounted within said blade hub (26), when each controllable-pitch blades' (28) blade pitch manipulator (54) is inserted into its respective pitch-manipulating path (56), and when said pitch manipulator (46) is forced in and out of said blade hub (26),
said rotating shaft (22) being inserted into said cylindrical cavity of said pitch manipulator (46),
said pitch manipulator (46) being inserted into said blade hub (26) such that the blade pitch manipulators (54) of each controllable-pitch blade (28) are inserted into said controllable-pitch blade's (28) respective pitch-manipulating path (56),
said pitch manipulator (46) being rotatably mounted into said axial modulator (32) and secured to said axial modulator (32) with said axial-modulator lock (52) in order to tie the linear motion of said axial modulator (32) with said pitch manipulator (46).

17. An apparatus for controllable-pitch blades (28) including
a stator system (20),
a rotating shaft (22) being rotatably mounted in said stator system (20),
a rotor thread (24) consisting of a helical groove being affixed on the exterior surface of said rotating shaft (22),
a blade hub (26) being affixed to said rotating shaft (22),
a plurality of blades (30), affixed to said blade hub (26), being formed to cause said blades (28, 30) to transfer mechanical energy between said rotating shaft (22) and a fluid in which one or more of said blades (28, 30) are immersed,
wherein one or more of the plurality of blades (3) is a controllable-pitch blade (28),
a rotatable base at the extent of each controllable-pitch blades' (28) blade,
said rotatable base of said controllable-pitch blade(s) (28) being rotatably mounted within said blade hub (26),
and characterized by,
an axial modulator (32) having a cylindrical cavity with a helical groove being capable of mating threadedly to said rotor thread (24),
said axial modulator (32) being threadedly mated to said rotor thread (24),
said blade hub (26) being constituted to allow said axial modulator (32) to move backwards and forwards within said hub,
said rotor thread (24) being disposed on said rotating shaft (22) to allow said axial modulator (32) to pass within said blade hub (26),
said controllable-pitch blades (28) being configured to interact with said axial modulator (32) such that said axial modulator's (32) motion through said blade hub (26) causes said controllable-pitch blades (28) to rotate within said hub,
said blade hub (26) being configured to allow said axial modulator (32) to interface with said controllable-pitch blades (28) such that said axial modulator's (32) motion through said blade hub (26) causes said controllable-pitch blades (28) to rotate within said hub,
an axial modulating mechanism (36, 38) being affixed to said stator system (20) and being constituted in order to communicate a torque to said axial modulator (32), even in the presence of rotation in said rotating shaft (22), in order to cause said axial modulator (32) to rotate relative to said rotating shaft (22) to cause said axial modulator (32) to undergo linear motion along said rotating shaft (22).

18. An apparatus as set forth in claim 17 further including
said axial modulator (32) being comprised of magnetic components that, when subjected to an imbalanced magnetic force, would tend to cause said axial modulator (32) to accelerate,
said magnetic components within said axial modulator (32) being disposed so as to cause said axial modulator (32) to rotate when said axial modulator (32) is threadedly constrained by said rotor thread (24) and when said axial modulator (32) is subjected to a magnetic force,
and characterized by,
said axial modulating mechanism (36, 38) consisting of one or more electromagnet(s) (36, 38) capable of generating an electromagnetic force capable of imparting a torque on said magnetic components of said axial modulator (32),
said axial modulating mechanism (36, 38) being disposed within said stator system (20) to enable said axial modulating mechanism (36, 38) to impart an electromagnetic force onto said axial modulator (32) when current is applied to said axial modulating mechanism (36, 38).

19. An apparatus as set forth in claim 18 further including
said magnetic components of said axial modulator (32) consisting of ferromagnetic material,
and characterized by,
said axial modulating mechanism's (36, 38) electromagnets being constituted in part by a set of one or more advancing electromagnets (36), being disposed and configured to generate an electromagnetic force to cause rotation in said axial modulator (32) which tends to cause said axial modulator (32) to move linearly in one axial direction relative to said rotor system when said rotating shaft (22) rotates in the clockwise direction,
said axial modulating mechanism's (36, 38) electromagnets being constituted in part by a set of one or more retarding electromagnets (38) being disposed and configured to generate an electromagnetic force to cause rotation in said axial modulator (32) which tends to cause said axial modulator (32) to move linearly in the direction opposite from that achieved by said advancing electromagnets (36) when said rotating shaft (22) rotates in the clockwise direction,
said advancing electromagnets (36) and said retarding electromagnets (38) being configured to cause rotation in the opposite direction when said rotating shaft (22) rotates in the counterclockwise direction.

20. An apparatus as set forth in claim 18 further including
a displacement sensor (42) capable of measuring the linear displacement of said axial modulator (32),
an electronics control unit (44) (ECU) having electronic circuits capable of receiving measurements from said displacement sensor (42) and capable of controlling said axial modulating mechanism (36, 38),
said displacement sensor (42) being electrically connected to said electronics control unit (44),
and characterized by,
said advancing electromagnets (36) and said retarding electromagnets (38) being electrically connected to said electronics control unit (44) in order for said ECU to control current applied thereto.

21. An apparatus as set forth in claim 17 further including:
a plurality of blade locks (48) being configured and disposed to rotatably constrain said controllable-pitch blade(s) (28) within said blade hub (26),
and characterized by,
a pitch manipulator (46) having a cylindrical shape and being configured to mount rotatably within said axial modulator (32),
said pitch manipulator (46) having a cylindrical cavity, being coaxial with said pitch manipulator's (46) cylindrical exterior, with a diameter large enough for said pitch manipulator (46) to pass by said rotor thread (24) when said cylindrical cavity of said pitch manipulator (46) is inserted into said rotating shaft (22),
an axial-modulator lock (52) being configured and disposed to constrain said pitch manipulator (46) to have linear motion tied with the linear motion of said axial modulator (32) while permitting said pitch manipulator (46) to rotate independently of said axial modulator (32), a blade pitch manipulator (54) having cylindrical form protruding from the rotatable base of each of said controllable-pitch blades (28) towards the interior of said blade hub (26) when said controllable-pitch blades (28) are rotatably mounted within said blade hub (26), each of said blade pitch manipulator(s) (54) being disposed radially away from the center of rotation of said blade pitch manipulators' (54) controllable-pitch blades (28), a plurality of pitch-manipulating paths (56) carved into said pitch manipulator's (46) exterior cylindrical surface through which a respective blade pitch manipulator (54) may pass when the respective blade pitch manipulator (54) is inserted into one of said pitch-manipulating paths (56) when said controllable-pitch blades (28) are rotatably mounted within said blade hub (26) and said pitch manipulator (46) is inserted into said blade hub (26), said pitch-manipulating paths (56) having distribution about said pitch manipulator's (46) exterior cylindrical circumference, depth, width and a profile along the length of said pitch manipulator's (46) cylindrical exterior to force said controllable-pitch blades (28) to rotate when said controllable-pitch blades (28) are rotatably mounted within said blade hub (26), when each controllable-pitch blades' (28) blade pitch manipulator (54) is inserted into its respective pitch-manipulating path (56), and when said pitch manipulator (46) is forced in and out of said blade hub (26), said rotating shaft (22) being inserted into said cylindrical cavity of said pitch manipulator (46), said pitch manipulator (46) being inserted into said blade hub (26) such that the blade pitch manipulators (54) of each controllable-pitch blade (28) are inserted into said controllable-pitch blade's (28) respective pitch-manipulating path (56), said pitch manipulator (46) being rotatably mounted into said axial modulator (32) and secured to said axial modulator (32) with said axial-modulator lock (52) in order to tie the linear motion of said axial modulator (32) with said pitch manipulator (46).

\* \* \* \* \*